(12) United States Patent
Huang et al.

(10) Patent No.: US 10,237,275 B2
(45) Date of Patent: *Mar. 19, 2019

(54) WIRELESS NETWORK ACCESS

(71) Applicant: GOOGLE LLC, Mountain View, CA (US)

(72) Inventors: Jonathan Huang, Sunnyvale, CA (US); David Bird, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,408

(22) Filed: Jul. 18, 2017

(65) Prior Publication Data
US 2017/0318018 A1 Nov. 2, 2017

Related U.S. Application Data

(63) Continuation of application No. 14/455,829, filed on Aug. 8, 2014, now Pat. No. 9,742,775.
(Continued)

(51) Int. Cl.
*H04L 29/06* (2006.01)
*H04W 12/06* (2009.01)
(Continued)

(52) U.S. Cl.
CPC ............ *H04L 63/101* (2013.01); *H04W 12/06* (2013.01); *H04W 12/08* (2013.01); *H04L 63/08* (2013.01); *H04W 84/12* (2013.01)

(58) Field of Classification Search
CPC ....... H04L 63/101; H04L 63/08; H04L 63/18; H04L 63/102; H04L 63/0823;
(Continued)

(56) References Cited

U.S. PATENT DOCUMENTS

| 7,254,119 B2 | 8/2007 | Jiang et al. |
| 7,411,911 B2 | 8/2008 | Huotari et al. |

(Continued)

FOREIGN PATENT DOCUMENTS

| EP | 1047228 A2 | 10/2000 |
| EP | 1598984 A2 | 11/2005 |

(Continued)

OTHER PUBLICATIONS

"Cloud Wifi app review: providing a secure platform to save, sync and share your Wifi," Feb. 2015, http://www.appicker.com/review/21889/cloud-wifi-app-review, 6 pages.
(Continued)

*Primary Examiner* — Don G Zhao
(74) *Attorney, Agent, or Firm* — Colby Nipper

(57) ABSTRACT

A system and machine-implemented method of wireless network access are provided. An authentication request comprising credentials for a user account of a cloud-based service is received from a wireless client device. The authentication request is forwarded to a server associated with the cloud-based service for authentication of the user account credentials. A list of one or more network identifiers corresponding to networks for which access by the user account of the cloud-based service is authorized is received from the server. The received list of one or more network identifiers is sent to the wireless client device, wherein the received list of one or more network identifiers is sent to the wireless client device prior to the wireless client device being associated with the wireless local area network.

33 Claims, 4 Drawing Sheets

Related U.S. Application Data

(60) Provisional application No. 62/019,856, filed on Jul. 1, 2014.

(51) Int. Cl.
*H04W 12/08* (2009.01)
*H04W 84/12* (2009.01)

(58) Field of Classification Search
CPC ............ H04L 2463/061; H04W 12/08; H04W 12/06; H04W 84/12; H04W 36/0038; H04W 88/00
See application file for complete search history.

(56) References Cited

U.S. PATENT DOCUMENTS

| | | | |
|---|---|---|---|
| 8,332,914 | B2 | 12/2012 | Buddhikot et al. |
| 8,428,036 | B2 | 4/2013 | Herscovici et al. |
| 8,522,315 | B2 | 8/2013 | Zhang et al. |
| 8,544,072 | B1 | 9/2013 | Masone et al. |
| 8,782,741 | B1 | 7/2014 | L'Heureux et al. |
| 9,055,062 | B1 | 6/2015 | Huang et al. |
| 9,143,940 | B2 | 9/2015 | Fukushima |
| 9,226,155 | B2* | 12/2015 | Dabbiere ............... H04L 12/145 |
| 9,742,775 | B2 | 8/2017 | Huang et al. |
| 2004/0181692 | A1 | 9/2004 | Wild et al. |
| 2005/0114496 | A1 | 5/2005 | Fang et al. |
| 2006/0133319 | A1 | 6/2006 | Kant |
| 2007/0021116 | A1 | 1/2007 | Okita et al. |
| 2007/0060105 | A1 | 3/2007 | Batta |
| 2007/0147318 | A1 | 6/2007 | Ross et al. |
| 2009/0070412 | A1 | 3/2009 | D'Angelo et al. |
| 2009/0187983 | A1 | 7/2009 | Zerfos et al. |
| 2010/0080202 | A1 | 4/2010 | Hanson et al. |
| 2010/0125903 | A1 | 5/2010 | Devarajan et al. |
| 2010/0182983 | A1 | 7/2010 | Herscovici et al. |
| 2010/0293250 | A1 | 11/2010 | Ankaiah et al. |
| 2011/0096678 | A1 | 4/2011 | Ketonen |
| 2012/0110640 | A1 | 5/2012 | Donelson et al. |
| 2012/0135711 | A1 | 5/2012 | Jabara et al. |
| 2012/0210011 | A1* | 8/2012 | Liu ..................... H04L 63/10 709/229 |
| 2012/0230221 | A1 | 9/2012 | Radhakrishnan et al. |
| 2012/0233672 | A1 | 9/2012 | Kezys et al. |
| 2012/0233679 | A1 | 9/2012 | Shedrinsky |
| 2012/0254614 | A1 | 10/2012 | Kimura et al. |
| 2013/0065633 | A1 | 3/2013 | Sridhara et al. |
| 2013/0097674 | A1 | 4/2013 | Jindal et al. |
| 2013/0115915 | A1 | 5/2013 | Tipton et al. |
| 2013/0198817 | A1 | 8/2013 | Haddad et al. |
| 2013/0223273 | A1 | 8/2013 | Chang et al. |
| 2013/0223279 | A1 | 8/2013 | Tinnakornsrisuphap et al. |
| 2013/0223308 | A1 | 8/2013 | Chandra et al. |
| 2013/0297662 | A1 | 11/2013 | Sharma et al. |
| 2014/0004832 | A1* | 1/2014 | Dabbiere ............... H04L 12/145 455/411 |
| 2014/0026179 | A1 | 1/2014 | Devarajan et al. |
| 2014/0068705 | A1 | 3/2014 | Chambers et al. |
| 2014/0073288 | A1 | 3/2014 | Velasco |
| 2014/0105007 | A1 | 4/2014 | Pathmasuntharam et al. |
| 2014/0126563 | A1 | 5/2014 | Chen et al. |
| 2014/0135042 | A1 | 5/2014 | Buchheim et al. |
| 2014/0165163 | A1 | 6/2014 | Salkintzis |
| 2014/0194153 | A1 | 7/2014 | Salkintzis |
| 2014/0196126 | A1 | 7/2014 | Peterson et al. |
| 2014/0215583 | A1 | 7/2014 | Ding |
| 2015/0071052 | A1 | 3/2015 | Hershberg et al. |
| 2015/0121481 | A1 | 4/2015 | Venkatanaranappa et al. |
| 2015/0327062 | A1 | 11/2015 | Tatavarty et al. |
| 2016/0006739 | A1 | 1/2016 | Huang et al. |
| 2016/0112980 | A1 | 4/2016 | Pai et al. |
| 2016/0294828 | A1 | 10/2016 | Zakaria |
| 2017/0063968 | A1 | 3/2017 | Kitchen et al. |
| 2017/0142086 | A1 | 5/2017 | Chen et al. |
| 2017/0257257 | A1 | 9/2017 | Dawes et al. |

FOREIGN PATENT DOCUMENTS

| | | |
|---|---|---|
| EP | 2940930 A1 | 11/2015 |
| EP | 3378211 | 9/2018 |
| WO | 2007/062108 A2 | 5/2007 |
| WO | WO-2013/002770 A1 | 1/2013 |
| WO | 2013/128242 A1 | 9/2013 |
| WO | WO-2015/043649 A1 | 4/2015 |
| WO | 2017087168 | 5/2017 |

OTHER PUBLICATIONS

"How Interworking Works: A Detailed Look at 802.1u and Hotspot 2.0 Mechanism," Ruckus Simply Better Wireless, 2014, www.ruckuswireless.com.
"How to set up a 1st gen Nest Protect with the Nest app," Jun. 2015, http://nest.com/support/article/how-do-i-connect-my-nest-protect-wi-fi-and-my-nest, 14 pages.
"W-Fi Certified Passpoint Architecture for Public Access," Aruba Networks, 2011, www.arubanetworks.com/whitepapers.
Vollbrecht, et al., "Wireless LAN Access Control and Authentication," Interlink Networks, 2002, www.interlinknetworks.com/whitepapers.
European Patent Office; European Search Report; Appl. No. 15814969.0; dated Jan. 30, 2018.
European Patent Office; European Search Report; Appl. No. 15810011.5; dated Jan. 22, 2018.
"Final Office Action", U.S. Appl. No. 14/944,165, dated Mar. 2, 2018, 34 pages.
"Final Office Action", U.S. Appl. No. 14/455,829, dated Jul. 25, 2016, 63 pages.
"Foreign Office Action", European Application No. 16795509.5, dated Jun. 26, 2018, 3 pages.
"International Preliminary Report on Patentability", PCT Application No. PCT/US2015/037809, dated Jan. 3, 2017, 12 pages.
"International Preliminary Report on Patentability", PCT Application PCT/US2015/037809, dated Jan. 3, 2017, 12 pages.
"International Preliminary Report on Patentability", PCT Application No. PCT/US2016/059939, dated May 22, 2018, 11 pages.
"International Search Report", PCT Application No. PCT/US2016/059939, dated Mar. 30, 2017, 6 pages.
"Invitation to Pay Additional Fees", PCT Application No. PCT/US2016/059939, dated Jan. 24, 2017, 7 pages.
"Non-Final Office Action", U.S. Appl. No. 14/455,873, dated Oct. 23, 2014, 4 pages.
"Non-Final Office Action", U.S. Appl. No. 14/455,829, dated Nov. 16, 2015, 44 pages.
"Non-Final Office Action", U.S. Appl. No. 14/455,829, dated Apr. 8, 2016, 46 pages.
"Non-Final Office Action", U.S. Appl. No. 14/944,165, dated Aug. 18, 2017, 33 pages.
"Notice of Allowance", U.S. Appl. No. 14/455,873, dated Aug. 30, 2018, 7 pages.
"Notice of Allowance", U.S. Appl. No. 14/455,829, dated Jan. 17, 2017, 19 pages.
"Notice of Allowance", U.S. Appl. No. 14/455,829, Apr. 18, 2017, 18 pages.
"Search Report", European Application No. 15810011.5, dated Jan. 22, 2018, 9 pages.
"Search Report", European Application No. 15814969.0, dated Jan. 30, 2018, 9 pages.
"Search Report", European Application No. 15812778.7, dated Feb. 13, 2018, 10 pages.
"Search Report", European Application No. 15829832.3, dated Mar. 1, 2018, 7 pages.
"Written Opinion", PCT Application No. PCT/US2016/059939, dated Mar. 20, 2017, 10 pages.
European Patent Office; Extended European Search Report; Appl. No. 15812778.7; dated Feb. 13, 2018.
European Patent Office; Extended European Search Report; Appl. No. 15829832.3; dated Mar. 1, 2018.
"Non-Final Office Action", U.S. Appl. No. 14/944,165, dated Sep. 6, 2018, 37 pages.

(56) References Cited

OTHER PUBLICATIONS

"Foreign Allowance", EP Application No. 15814969.0, dated Jan. 4, 2019, 44 pages.
"Foreign Office Action", European Application No. 20150829832, dated Jan. 15, 2019, 5 pages.
"Search Report", European Application No. 20150829832, dated Mar. 1, 2018, 7 pages.

\* cited by examiner

WIRELESS NETWORK ACCESS

CROSS-REFERENCE TO RELATED APPLICATION

This application is a continuation of U.S. patent application Ser. No. 14/455,829, filed Aug. 8, 2014, entitled "WIRELESS LOCAL AREA NETWORK ACCESS", which claims priority to U.S. Provisional Patent Application No. 62/019,856, filed on Jul. 1, 2014, entitled "WIRELESS LOCAL AREA NETWORK ACCESS," the entire contents of which are herein incorporated by reference in their entirety.

BACKGROUND

The present disclosure generally relates to providing network access, and in particular, to wireless local area network access.

Wireless local area networks have greatly improved the way users access information on the internet. Accessing a wireless local area network may require a user to select the service set identifier (SSID) of a wireless access point within the wireless local area network. In addition, the user may need to enter a passphrase (e.g., Wi-Fi protected passphrase) of the wireless access point or use other types of credentials to establish a wireless network connection.

SUMMARY

The disclosed subject matter relates to an access system for a wireless local area network. The system comprises one or more processors, and a machine-readable medium comprising instructions stored therein, which when executed by the one or more processors, cause the one or more processors to perform operations comprising receiving, from a wireless client device, an authentication request comprising credentials for a user account of a cloud-based service. The operations further comprise forwarding the authentication request to a server associated with the cloud-based service for authentication of the user account credentials. The operations further comprise receiving, from the server, a list of one or more network identifiers corresponding to networks for which access by the user account of the cloud-based service is authorized. In addition, the operations comprise sending the received list of one or more network identifiers to the wireless client device, wherein the received list of one or more network identifiers is sent to the wireless client device prior to the wireless client device being associated with the wireless local area network.

The disclosed subject matter also relates to a machine-readable medium comprising instructions stored therein, which when executed by a system, cause the system to perform operations comprise sending an advertisement indicating availability of authentication with a cloud-based service. The operations further comprise receiving, from a wireless client device, an authentication request comprising credentials for a user account of the cloud-based service. The operations further comprise forwarding the authentication request to a server associated with the cloud-based service for authentication of the user account credentials. The operations further comprise receiving, from the server, a list of one or more network identifiers corresponding to networks for which access by the user account of the cloud-based service is authorized. In addition, the operations comprise sending the received list of one or more network identifiers to the wireless client device, wherein the received list of one or more network identifiers is sent to the wireless client device prior to the wireless client device being associated with the wireless local area network.

The disclosed subject matter also relates to a computer-implemented method for wireless local area network access. The method comprises receiving, from a wireless client device, an authentication request comprising credentials for a user account of a cloud-based service. The method further comprises forwarding the authentication request to a server associated with the cloud-based service for authentication of the user account credentials. The method further comprises receiving, from the server, a phonebook for one or more network identifiers corresponding to networks for which access by the user account of the cloud-based service is authorized. In addition, the method comprises sending the received phonebook to the wireless client device, wherein the received phonebook is sent to the wireless client device prior to the wireless client device being associated with the wireless local area network.

The disclosed subject matter also relates to a machine-readable medium comprising instructions stored therein, which when executed by a system, cause the system to perform operations comprise receiving a message from a first access device indicating availability of authentication with an cloud-based service for access to a first wireless local area network. The operations further comprise sending an authentication request to the first access device, the authentication request comprising credentials for a user account of the cloud-based service. In addition, the operations comprise receiving a phonebook for one or more network identifiers corresponding to networks for which access by the user account of the cloud-based service is authorized, wherein the phonebook is received prior to association with the first access device for the first wireless local area network.

The disclosed subject matter further relates to a wireless client system. The system comprises one or more processors, and a machine-readable medium comprising instructions stored therein, which when executed by the one or more processors, cause the one or more processors to perform operations comprising receiving a message from a first access device indicating availability of authentication with an cloud-based service for access to a first wireless local area network. The operations further comprise sending an authentication request to the first access device, the authentication request comprising credentials for a user account of the cloud-based service. The operations further comprise receiving a list of one or more network identifiers corresponding to networks for which access by the user account of the cloud-based service is authorized, wherein the list of one or more network identifiers is received prior to association with the first access device for the first wireless local area network. The operations further comprise checking the received list for a first network identifier corresponding to the first wireless local area network of the first access device. The operations further comprise sending an association request to the first access device if the received list includes the first network identifier corresponding to the first wireless local area network of the first access device. In addition, the operations comprise receiving an association confirmation from the first access device confirming association with the first wireless local area network of the first access device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
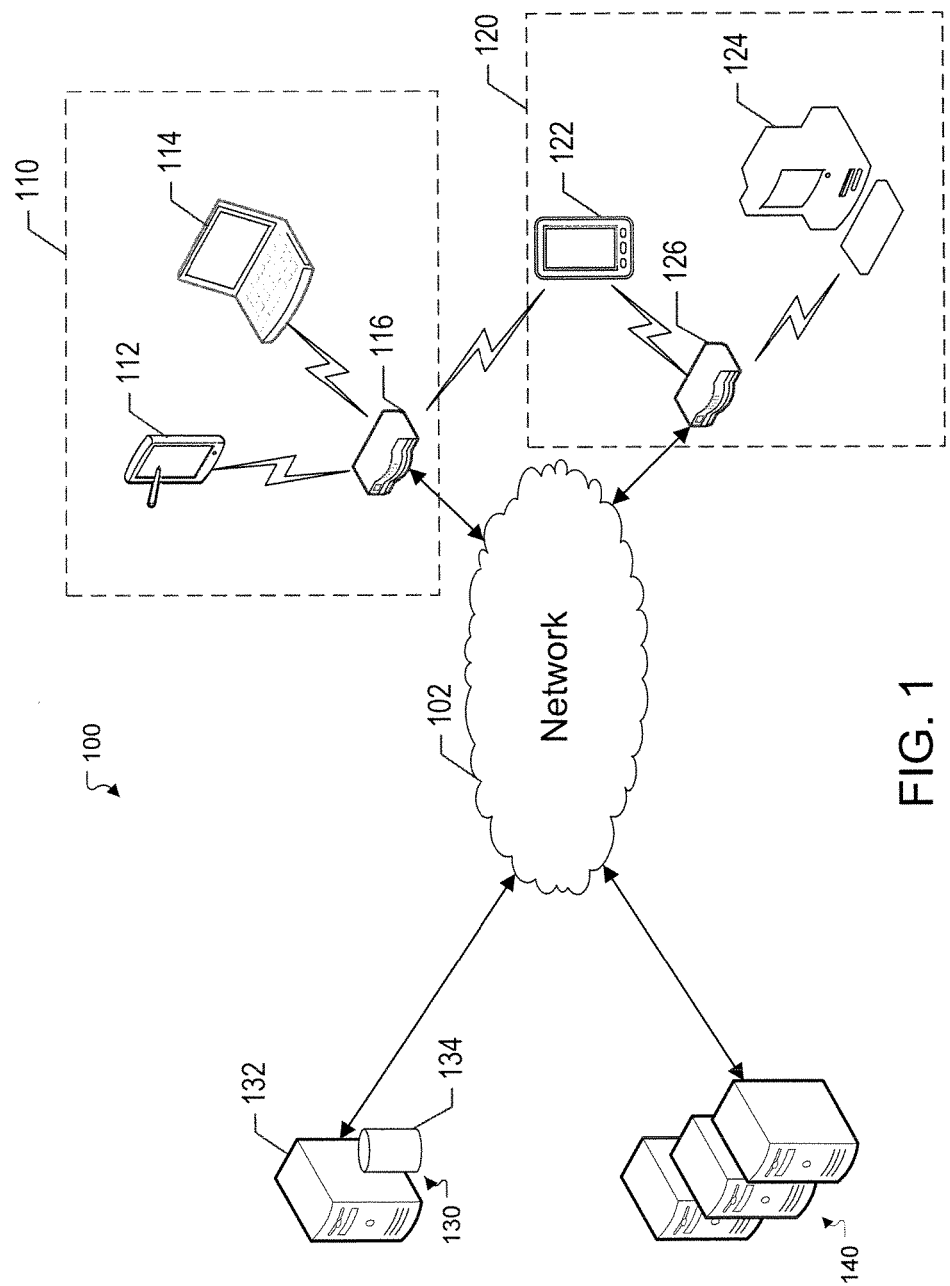
FIG. 1 illustrates an example network environment which provides for wireless network access.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As noted above, wireless local area networks have greatly improved the way users access information on the internet. Accessing a wireless local area network may require a user to select the service set identifier (SSID) of a wireless access point within the wireless local area network. In addition, the user may need to enter a network specific passphrase (e.g., Wi-Fi protected passphrase) of the wireless access point or credentials (e.g., username, realm, password, X.509 certificate, or Subscriber Identity Module (SIM) card) specific to the user to establish a wireless network connection.

However, limitations associated with accessing a wireless local area network may negatively impact user experience on a variety of levels. For example, the user may identify multiple SSIDs within an area, such as within an apartment complex. Each SSID may not provide useful information about the wireless local area network, such as "MyWiFi" or "4815162342" or "I love lamp." The user may need to ask the owner of the wireless local area network which SSID to select. After determining which SSID to select, the user may need to ask the owner of the wireless local area network for a passphrase to enter. On some devices, such as mobile devices, passphrase entry may be inconvenient, particularly if the passphrase is complex. In addition, the user may find it annoying to look up the SSID and/or passphrase each time they wish to connect a new device to the wireless local area network.

The owner of the wireless local area network may find it cumbersome to manage network access. The owner of the wireless local area network may need to share the SSID and passphrase each time when a new guest is trying to connect to the wireless local area network. The owner of the wireless local area network may forget the passphrase and need to keep a record of the passphrase. However, security of the wireless local area network may be compromised if the record is lost. In addition, the owner of the wireless local area network may not be able to revoke an access authorization for a guest without changing the previously provided passphrase. Other security solutions, such as Wi-Fi Protected Access (WPA) enterprise can be difficult to setup and manage.

The subject technology provides an improved system for accessing wireless local area networks. Management of access to a wireless local area network may be based on online identities of the users, instead of the SSID and passphrase of a wireless access point. Devices of authorized users may automatically discover and connect to the wireless local area network based on authorization granted by the network owner to online accounts associated with the users.

In some implementations, the wireless access point receives an authentication request from the wireless client device. The authentication request may include credentials for a user account of an online service. The online service may include a social networking service, an electronic messaging service, a subscriber service and/or other online services. The credentials for a user account may include a user account name, a user account password, a Network Access Identifier (NAI) realm and/or any user identification item corresponding to the user account. The wireless access point may receive a pre-authentication request from the wireless client device to verify the acceptance of a realm for authentication. The pre-authentication request may use Generic Advertisement Service (GAS) or access network query protocol (ANQP).

In some implementations, prior to the wireless client device sending the authentication request, the wireless access point may send an advertisement indicating availability of authentication with the online service. The advertisement may include a beacon message sent by the wireless access point. Alternatively, the advertisement may be sent in response to receiving an information request from the wireless client device.

In some aspects, the wireless access point forwards the authentication request to a server associated with the online service for authentication of the user account credentials. After the credentials have been authenticated by the server, the wireless access point may receive a list of network identifiers (e.g., a phonebook), corresponding to networks for which access by the user account of the online service is authorized, from the server. A network identifier may be a SSID, Basic Service Set Identifier (BSSID), media access control (MAC) address, Roaming Consortium Organization Identifier (OI), NAI realm, domain name, and/or 3rd Generation Partnership Project (3GPP) cellular network identifier. Prior to the wireless client device being associated with the wireless local area network, the wireless access point may send the received list of network identifiers to the wireless client device.

The list of network identifiers may be ordered based on social indicators associating the user of the wireless client device with network owners of the networks corresponding to the network identifiers. The ordered list may be used by the wireless client device in selecting which of multiple accessible wireless local area networks to establish a connection with. If the wireless access point is not on the list, the wireless client device may select another wireless local area network on the list and seek to establish a link with a wireless access point for that network. The list of network identifiers also may be ordered based on other information such as previously accessed wireless local area networks and/or frequency of access to those networks.

In some aspects, a bloom filter configured to identify network identifiers corresponding to networks for which access by the user account of the online service is authorized may be sent to the wireless client device. The bloom filter may be provided in place of the list of network identifiers, in order to reduce the amount of data sent to the wireless client device. Using the bloom filter, the wireless client device can determine accessibility of authorized wireless local area networks within range of the wireless client device.

FIG. 1 illustrates an example network environment which provides for wireless network access. Network environment 100 includes wireless local area networks 110 and 120, network 102, server 130 and servers 140. Wireless local area network 110 includes wireless client devices 112 and 114, and wireless access point 116. Wireless local area network 120 includes wireless client devices 122 and 124, and wireless access point 126.

Wireless client devices 112, 114 or 122, 124 may allow a user to access a wireless local area network, such as wireless local area network 110 or 120, by authenticating credentials of the user with an authentication service, such as provided by server 130.

Each of wireless client devices 112, 114 and 122, 124 represents various forms of processing devices. Example processing devices include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Example wireless client devices 112,114 and 122, 124 are discussed further below with respect to FIG. 2.

Server 130 can include one or more computing devices 132 and one or more computer-readable storage devices 134 (e.g., data stores). Server 130 may be a system or device having a processor, a memory, and communications capability for providing content and/or services to client devices. In some example aspects, server 130 can be a single computing device, for example, a computer server. In other embodiments, server 130 can represent more than one computing device working together to perform the actions of a server computer (e.g., cloud computing). Further, server 130 can represent various forms of servers including, but not limited to an application server, a proxy server, a network server, an authentication server, an electronic messaging server, a content server, etc., accessible to the wireless client devices 112,114 and 122,124. In some aspects, server 130 may be an authentication server that provides user authentication services for wireless local area network access.

Each of servers 140 can be a single computing device such as a computer server or can represent more than one computing device working together to perform the actions of a server computer (e.g., cloud computing). Server 130 and servers 140 may be implemented as a single server or across multiple servers. Servers 140 may perform various functionalities and/or storage capabilities described herein either alone or in combination with server 130. Each of servers 140 may host various services. For example, one of servers 140 may host services including cloud-based services.

A cloud-based service may include a service provided by cloud computing resources, such as, but not limited to, server 130, servers 140 and/or other computing resources accessible via one or more networks (e.g., network 102). A cloud-based service may require authentication of a user account for access via a cloud-based application, such as a web-based personal portal or a web-based email application.

A cloud-based service may include a social networking service. A social networking service may enable users to create a profile and associate themselves with other users of the social networking service. For example, a user of a social networking service may have different groups of friends, coworkers, and family, and there may be some overlap among those groups (e.g., a coworker who is also considered to be a friend, a family member who is also a coworker). In some aspects, a social networking service may allow users to share content and messages with other users of the social networking service.

A user may interact with content and/or services hosted by server 130, through a client application installed at wireless client device 112, such as a web browser application. Communication between wireless client device 112 and server 130 may be facilitated through wireless local area network 110 and network 102.

Wireless client devices 112, 114 and/or 122, 124 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

Network 102 can include, for example, any one or more of a campus area network (CAN), a metropolitan area network (MAN), a wide area network (WAN), a broadband network (BBN), the Internet, and the like. Further, network 102 can include, but is not limited to, any one or more of the following network topologies, including a bus network, a star network, a ring network, a mesh network, a star-bus network, tree or hierarchical network, and the like.

Communication between clients (e.g., wireless client devices 112, 114 and/or 122, 124) and servers (e.g., server 130 and/or servers 140) can occur via a virtual private network (VPN), Secure Shell (SSH) tunnel, Transport Layer Security (TLS) tunnel, Extensible Authentication Protocol (EAP)-TLS based tunnel, tunnel on top of GAS/ANQP, or other secure network connection. Network 102 may include one or more network devices that facilitate communications between wireless client devices 112, 114 and/or 122, 124 and server 130 and/or servers 140, such as switch devices, router devices, relay devices, etc., and/or may include one or more servers.

Wireless local area networks 110 and 120 can include, but are not limited to, a computer network that covers a limited geographic area (e.g., a home, school, computer laboratory, or office building) using a wireless distribution method (e.g., spread-spectrum or OFDM). Wireless client devices 112 and 114 may associate with wireless access point 116 to access wireless local area network 110 using WiFi standards (e.g., IEEE 802.11).

Each of wireless local area networks 110 and 120 is illustrated as including multiple wireless client devices 112, 114 or 122, 124. However, each of wireless local area network 110 and 120 may include only one of wireless client devices 112, 114 or 122, 124.

Network environment 100 is illustrated as including multiple wireless local area networks 110 and 120. However, network environment 100 may include only one of wireless local area networks 110 and 120. In some implementations, wireless local area networks 110 and/or 120 may be, or may include, one or more of a bus network, a star network, a ring network, a relay network, a mesh network, a star-bus network, a tree or hierarchical network, and the like.

Wireless access point 116 and/or 126 is a network device and can include other network devices, such as a hub, a router, a switch, and/or a bridge. The network device may be a combination of network devices, such as a wireless router that includes a router, a switch, and a wireless access point. The network device can be a wireless router with a built in modem (e.g., cable modem) for example. Other network devices can also be utilized in implementations of the subject technology.

Figure 2:
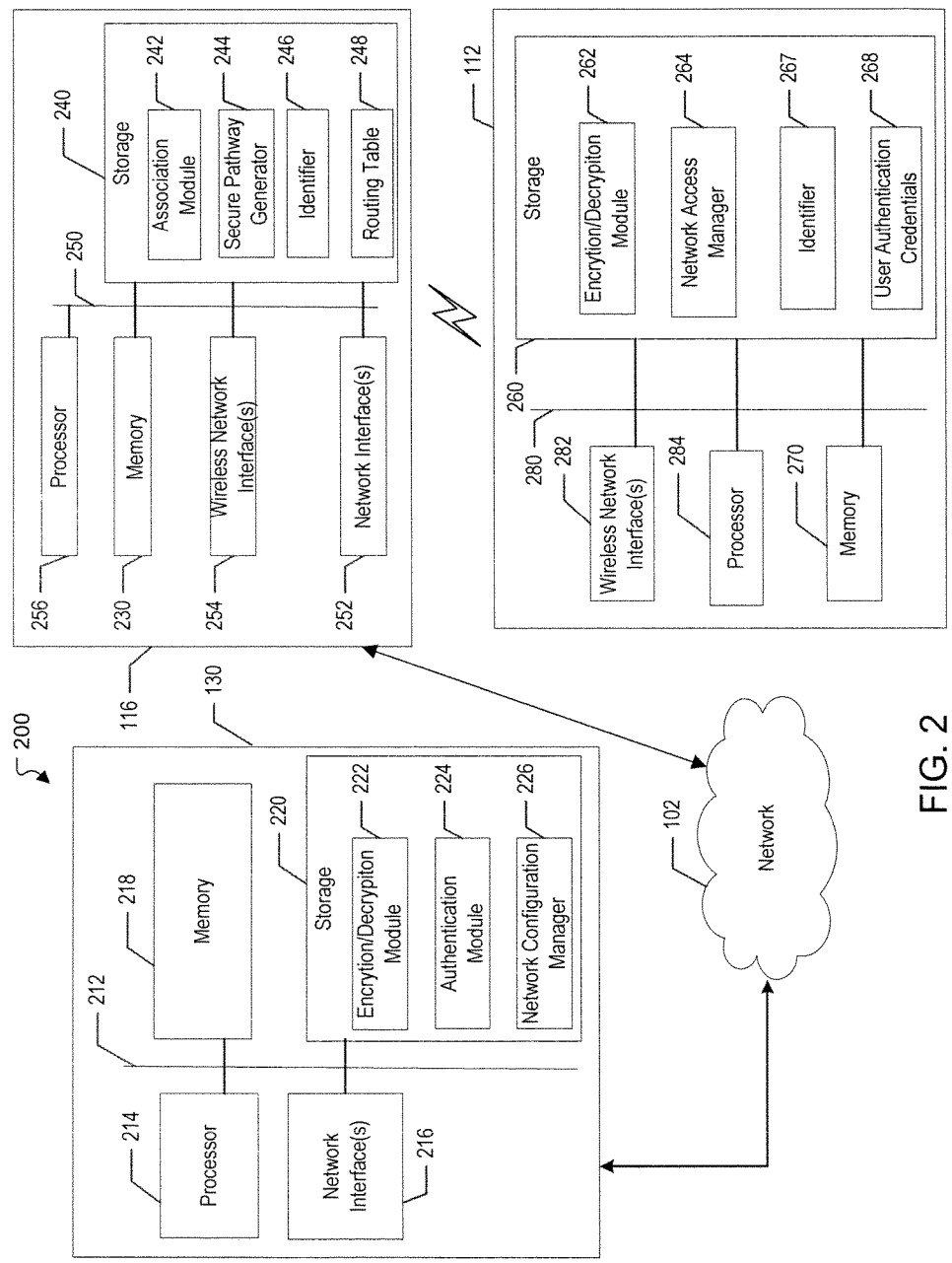
FIG. 2 is a block diagram illustrating an example wireless client device, server and wireless access point from the network environment of FIG. 1 according to certain aspects of the disclosure.

FIG. 2 is a block diagram illustrating an example wireless client device 112, server 130 and wireless access point 116 from the network environment of FIG. 1 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

Wireless client device 112 includes memory 270, processor 284, storage 260, bus 280 and one or more wireless network interfaces 282. Wireless client device 112 may establish a network connection with wireless access point 116 via one or more wireless network interfaces 282.

Memory 270 may include a dynamic random-access memory (DRAM) and/or a read-only memory (ROM). Memory 270 may store data and instructions that may be retrieved by processor 284. Storage 260 may include a non-volatile read-and-write memory that stores data and instructions, even when wireless client device 112 is off, that may be retrieved by the processor 284. Storage 260 may include encryption/decryption module 262, network access manager 264, identifier 267, and user authentication credentials 268. Storage 206 may include magnetic, solid state or optical media.

From memory 270 and/or storage 260, processor 284 may retrieve instructions to execute and data to process in order to perform the processes of the subject disclosure. Processor 284 can be a single processor, a multi-core processor or multiple processors. Each of encryption/decryption module 262 and network access manager 264 may include instructions that, when executed by processor 284, cause processor 284 to perform operations described below.

Network access manager 264 may include instructions to manage wireless connections between wireless client device 112 and a wireless local area network. Network access manager 264 may include instructions to discover and determine the capabilities of wireless access points, send an authentication request for wireless local area network access, identify and select a wireless local area network to access, and associate with a wireless access point to access the wireless local area network.

Network access manager 264 may include instructions to communicate with a wireless access point using ANQP, which is supported by WiFi standards (e.g., IEEE 802.11u, Hotspot 2.0). Network access manager 264 may include instructions to determine if wireless access point 116 supports authentication via a cloud-based server. Network access manager 264 may include instructions to generate an authentication request, including, for example, user authentication credentials 268.

Network access manager 264 may include instructions to identify and/or select one or more wireless local area networks that the user is authorized to access. In example aspects, network access manager 264 may include instructions to receive a list of one or more wireless local area networks that the user is authorized to access from server 130. Network access manager 264 may include instructions to select a wireless local area network within the list to associate with based on the order of the list. In example aspects, network access manager 264 may include instructions to receive a bloom filter from server 130. Network access manager 264 may include instructions to utilize the bloom filter to determine one or more nearby wireless local area networks that the user is authorized to access. Network access manager 264 may include instructions to associate wireless client device 112 with a wireless access point to access a wireless local area network that the user is authorized to access.

Encryption/decryption module 262 may include instructions to perform encryption and/or decryption of transmissions to/from server 130. Encryption/decryption module 262 may include instructions to encrypt the authentication request, for example, using one or more cryptographic keys stored in the memory 270. Wireless client device 112 may provide the encrypted authentication request to server 130, e.g., via wireless access point 116 and network 102.

Identifier 267 may be an identifier that is associated with wireless client device 112, such as a MAC address. User authentication credentials 268 may include credentials for a user account of a cloud-based service that is associated with a user of wireless client device 112. In some aspects, credentials for a user account of a cloud-based service may include a user account name, a user account password, a realm, an email address and/or any item corresponding to the user account of the cloud-based service. Credentials for a user account of a cloud-based service may be used for user account authentication, such as at server 130. Upon user account authentication, server 130 may identify personal information about the user, such as information about user social network, contacts, user preferences, historical activity, and profile information.

In situations in which the system and processes discussed herein collect or make use of personal information about users, the users may be provided with an opportunity to control whether and/or to what extent the programs or features collect and make use of such user information, or to control whether and/or how to receive content that may be more relevant to the user. In addition, where personal information about the user is stored and/or shared with one or more other users, various privacy controls may be employed to facilitate protecting the storing and/or sharing of such content, such as the user may be provided with an opportunity to limit the visibility of the personal information to one or more other users.

Wireless access point 116 includes memory 230, processor 256, storage 240, bus 250, one or more wireless network interfaces 254 and one or more network interfaces 252. Wireless access point 116 may establish a network connection with wireless client device 112 via one or more wireless network interfaces 254. Wireless access point 116 may establish a network connection with network 102 via one or more network interfaces 252.

Memory 230 may include a dynamic random-access memory (DRAM) and/or a read-only memory (ROM). Memory 230 may store data and instructions that may be retrieved by processor 256. Storage 240 may include a non-volatile read-and-write memory that stores data and instructions, even when wireless access point 116 is off, that may be retrieved by the processor 256. Storage 240 may include association module 242, secure pathway generator 244, identifier 246 and routing table 248. For example, storage 240 may include magnetic, solid state or optical media.

From memory 230 and/or storage 240, processor 256 may retrieve instructions to execute and data to process in order to perform the processes of the subject disclosure. Processor 256 can be a single processor, a multi-core processor or multiple processors. Each of association module 242 and secure pathway generator 244 may include instructions that, when executed by processor 256, cause processor 256 to perform operations described below.

Association module 242 may include instructions to manage wireless connections between wireless access point 116 and wireless client devices. Association module 242 may include instructions to broadcast capabilities of authentication and association, respond to queries and authentication requests from wireless client devices, associate with wireless client devices based on user account credentials, and grant wireless local area network access.

Association module 242 may include instructions to send an advertisement, such as a beacon, about the capabilities of wireless access point 116. Association module 242 may include instructions to respond to queries from wireless client device 112 and indicate the capabilities of wireless access point 116. In example aspects, association module 242 may include instructions to detect an authentication request from wireless client device 112 and forward the authentication request to server 130.

Association module 242 may include instructions to grant access to wireless local area network 110 in response to an association request, such as from wireless client device 112. Association module 242 may include instructions to associate with wireless client device 112 to access wireless local area network 110 based on authentication of user account credentials. In example aspects, association module 242 may include instructions to send a notification of the association of wireless client device 112 to server 130.

Secure pathway generator 244 may include instructions to generate a secure pathway within wireless access point 116, such as a secure connection between wireless client device 112 and server 130. In some aspects, secure pathway generator 244 may include instructions to encapsulate transmissions between wireless client device 112 and server 130 in a tunnel, such as a TLS tunnel, EAP-TLS based tunnel, tunnel on top of GAS/ANQP. For example, secure pathway generator 244 may include instructions to transport user authentication credentials 268 to server 130 via the tunnel.

In example aspects, wireless access point 116 may receive a security token, such as a nonce, from server 130 and may transmit the security token to wireless client device 112 via the secure pathway. Wireless client device 112 may then provide the security token back to the server 130, via the secure pathway. In some aspects, secure pathway generator 244 may include instructions to forward one or more encryption keys from server 130 to wireless client device 112 and may forward encrypted content from server 130 to wireless client device 112. In some aspects, secure pathway generator 244 may include instructions to forward the encrypted content and/or encryption keys.

Identifier 246 may be an identifier that is associated with the wireless access point 116, such as a network identifier including a BSSID (e.g., MAC address), and/or a SSID. The owner of the wireless access point 116 may register identifier 246 with a service, for example, an authentication service hosted by server 130.

Routing table 248 may include route information about directly connected and remote networks associated with wireless access point 116. Routing table 248 may list the routes to particular network destinations, and in some cases, metrics (e.g., distances) associated with those routes. Wireless access point 116 may search the routing information stored in routing table 248 to forward a data packet toward its destination network, for example, based on a destination IP address of the data packet.

Server 130 may include memory 218, processor 214, storage 220, bus 212 and one or more network interfaces 216. Server 130 may establish a network connection with network 102 via one or more network interfaces 216.

Memory 218 may include a dynamic random-access memory (DRAM) and/or a read-only memory (ROM). Memory 218 may store data and instructions that may be retrieved by processor 214. Storage 220 may include a non-volatile read-and-write memory that stores data and instructions, even when server 130 is off, that may be retrieved by processor 214. Storage 220 may include encryption/decryption module 222, authentication module 224 and network configuration manager 226. For example, storage 220 may include a magnetic, solid state or optical media.

From memory 218 and/or storage 220, processor 214 may retrieve instructions to execute and data to process in order to perform the processes of the subject disclosure. Processor 214 can be a single processor, a multi-core processor or multiple processors. Each of encryption/decryption module 222, authentication module 224 and network configuration manager 226 may include instructions that, when executed by processor 214, cause processor 214 to perform operations described below.

Encryption/decryption module 222 may include instructions to assign one or more cryptographic keys to wireless client device 112. In some aspects, encryption/decryption module 222 may include instructions to generate a random number and may encrypt/sign the random number using a cryptographic key assigned to wireless client device 112. Authentication module 224 may include instructions to authenticate the user, for example, by verifying user authentication credentials 268 at a cloud-based service.

Network configuration manager 226 may include instructions to provide a user interface that allows network owners to login and share wireless local area network access with other users by associating identifiers of the user with network identifiers of their networks. The user interface may be a graphical user interface with elements representing different users and networks.

For example, the owner of the wireless local area network may add an authorized user to access the wireless local area network by providing a user account credential (e.g., email address) of the authorized user or selecting a user within a shared social network group. The owner of the wireless local area network may associate authorized users to the network identifier to the wireless local area network.

Network configuration manager 226 may include instructions to identify one or more network identifiers (e.g., BSSID), corresponding to one or more wireless local area networks that a user is authorized to access. For example, network configuration manager 226 may include instructions to determine that the user is an authorized user to access multiple wireless local area networks by comparing the credentials of the user with the credentials of the authorized users. Network configuration manager 226 may include instructions to identify the network identifiers associated with the multiple wireless local area networks.

Based on the identification, network configuration manager 226 may include instructions to generate a list of the one or more network identifiers. In example aspects, network configuration manager 226 may include instructions to update the list of the one or more network identifiers, for example, periodically. In some aspects, network configuration manager 226 may include instructions to arrange the list of the one or more network identifiers in an order based on social indicators associating the authorized user with the network owners associated with the networks. In some aspects, network configuration manager 226 may include instructions to generate a compact data structure, such as a bloom filter, for probabilistic representation of the one or more network identifiers of the wireless local area networks that the authorized user can access.

Figure 3:
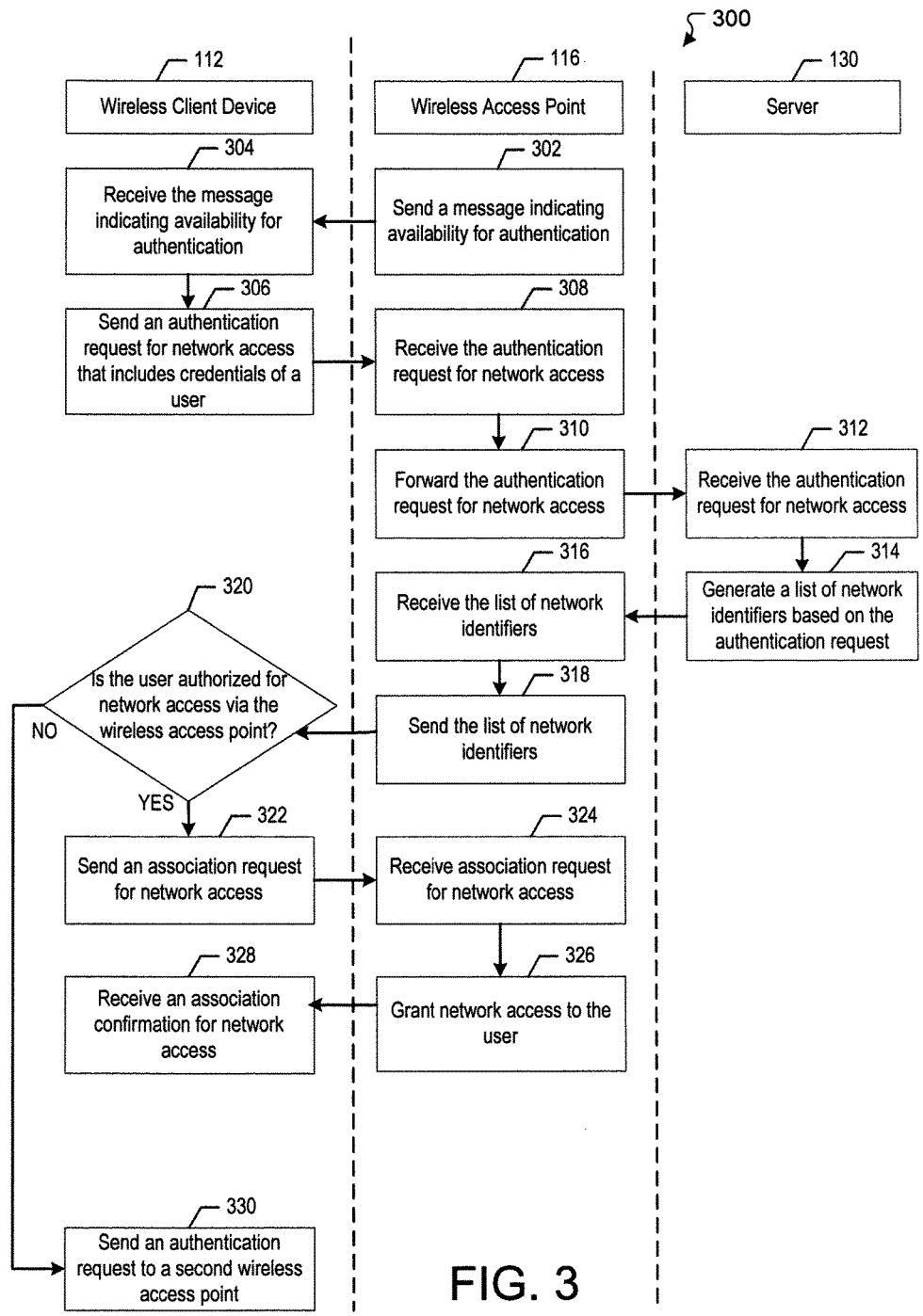
FIG. 3 illustrates a flow diagram of an example process for providing wireless network access.

FIG. 3 illustrates a flow diagram of an example process 300 for providing wireless network access. For explanatory purposes, the example process 300 is primarily described herein with reference to wireless access point 116, wireless client device 112, and server 130 of FIGS. 1-2; however, the example process 300 is not limited to wireless access point 116, wireless client device 112, and server 130 of FIGS. 1-2, and the example process 300 may be performed by one or more components of wireless access point 116, wireless client device 112, and server 130. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

At step 302, wireless access point 116 sends a message indicating availability for authentication. Wireless access point 116 may send an advertisement indicating availability of authentication with a cloud-based service. The advertisement may include a beacon message and may be sent prior to wireless client device 112 sending an authentication request. In some aspects, wireless access point 116 may receive an information request, from wireless client device 112 prior to wireless client device 112 sending the authentication request. The advertisement may be sent by wireless access point 116 in response to receiving the information request from wireless client device 112.

For example, wireless access point 116 may send a beacon indicating capabilities for authentication with a cloud-based service, supporting ANQP and/or WiFi standards including IEEE 802.11u and 802.1x. In some aspects, wireless client device 112 may query wireless access point 116, such as in a form of a GAS request, when wireless client device 112 is in an unauthenticated and unassociated state with wireless access point 116. The GAS request may include a list of ANQP elements that wireless client device 112 wants to receive from wireless access point 116, including, for example, capabilities for authentication with a cloud-based service. Wireless access point 116 may provide a GAS response to wireless client device 112 with the list of ANQP element, including, for example, capabilities for authentication with a cloud-based service. The ANQP elements may include pre-determined ANQP elements, which are supported by WiFi standards (e.g., IEEE 802.11u, Hotspot 2.0). In some aspects, the ANQP elements may include vendor-specific elements, which are reserved to query for nonstandard information (e.g., not defined in IEEE 802.11u) and interoperability may be more easily achieved in the presence of nonstandard information.

At step 304, wireless client device 112 receives the message indicating availability for authentication, such as via wireless network interfaces 282. Wireless client device 112 may discover the capabilities of wireless access point 116 by scanning a beacon sent from wireless access point 116. In some aspects, wireless client device 112 may discover the capabilities of wireless access point 116 by receiving a GAS response.

At step 306, wireless client device 112 sends an authentication request associated with a user for wireless network access that includes credentials of the user. The authentication request may include credentials for a user account of a cloud-based service associated with the user, such as user authentication credentials 268. Wireless client device 112 may need to validate a digital certificate (e.g., SSL certificate, X.509 certificate) to transmit the authentication request securely.

At step 308, wireless access point 116 receives the authentication request for wireless network access, such as via wireless network interfaces 254. At step 310, wireless access point 116 forwards the authentication request to server 130. The identity of the user associated with the authentication request may not be exposed to wireless access point 116. For example, wireless access point may transport the authentication request to server 130 via a TLS tunnel.

At step 312, server 130 receives the authentication request for wireless network access, such as via network 102. Based on the authentication request, server 130 may authenticate the user and determine the user as an authorized user to access one or more wireless network access.

At step 314, server 130 generates a list of one or more network identifiers based on the authentication request. The list of one or more network identifiers may correspond to one or more wireless local area networks that the user is authorized to access. Server 130 may arrange the list in an order based on social indicators associating the user with the network owners of the one or more wireless local area networks that the user is authorized to access.

A social indicator may be an indication or a score to indicate the level of association between two users of the social networking service. In some aspects, the social indicator may include frequency of electronic messaging between the authorized user with a network owner and/or a shared social network group. The social indicator may indicate a strong or close association between the authorized user with the network owner based on frequent electronic messaging between them.

In example aspects, the social indicator may include a relationship category between the authorized user with a network owner. A relationship category, such as close friend, family, or acquaintance, may be determined from profile information of the authorized user and the network owner. Profile information for each user may include, for example, a user name, user dates (e.g., birthday, anniversary, etc.), user location (e.g., home and/or business address), user preferences, affinity and contact information, social activity associated with the user, and/or other similar information. A social graph from the social networking service may be used to determine relationships between users and network owners.

In some aspects, server 130 may generate a bloom filter configured to identify the one or more network identifiers corresponding to networks that the user is authorized to access. The bloom filter may be a data structure and an alternative representation of the one or more network identifiers, compared with the list of the one or more network identifiers. The size of the bloom filter may be smaller than the list of the one or more network identifiers. The bloom filter may allow a faster search of a network identifier in the list of the one or more network identifiers, comparing with searching through the entire list of the one or more network identifiers.

At step 316, wireless access point 116 receives the list of one or more network identifiers, for example, such as via network interfaces 252. At step 318, wireless access point 116 sends the received list of one or more network identifiers to wireless client device 112. The received list of one or more network identifiers may be sent to wireless client device 112 prior to wireless client device 112 being associated with wireless local area network 110, via wireless access point 116.

At step 320, wireless client device 112 determines that if the user is authorized for wireless network access via wireless access point 116. In some aspects, wireless client device 112 may determine whether the user is authorized for wireless network access via wireless access point 116, from the received list of one or more network identifiers. For example, the network identifier of wireless access point 116 may be in the received list of one or more network identifiers. In example aspects, wireless client device 112 may utilize the bloom filter received from server 130 to identify one or more wireless local area networks that the user is authorized to access. For example, wireless client device 112 may send a query to the received bloom filter and receive a response to the query. From the response, wireless client device 112 may determine whether the user is authorized for wireless network access via wireless access point 116.

If the user is authorized to access a wireless local area network via wireless network access point 116, wireless client device 112 sends an association request for wireless network access to wireless access point 116 at step 322. At step 324, wireless access point 116 receives the association request for wireless local area network access, from wireless client device 112. Based on the association request, wireless access point 116 may determine the user as an authorized user to access wireless local area network 110 via wireless access point 116.

At step 326, wireless access point 116 grants wireless network access to the user. Wireless access point 116 may allow wireless client device 112 to connect to the internet, such as network 102, by generating a wireless link to access wireless local area network 110. Wireless access point 116 may send a notification of the association of wireless client device 112 to server 130. At step 328, wireless client device 112 receives an association confirmation for wireless network access.

If the user is not authorized for wireless network access via wireless access point 116, wireless client device 112 sends an association request for wireless network access to a second wireless access point, such as wireless access point 126, at step 330. For example, the network identifier of wireless access point 116 may not be in the received list of one or more network identifiers. Wireless client device 112 may send an authentication request for a second wireless local area network, such as wireless local area network 120. The authentication request may include credentials for a user account of a cloud-based service, such as user authentication credentials 268. In some aspects, wireless client device 112 may select the second network identifier in the received list of one or more network identifiers based on the order of the list, most recently connected networks, signal strength, social indicators, etc.

Figure 4:
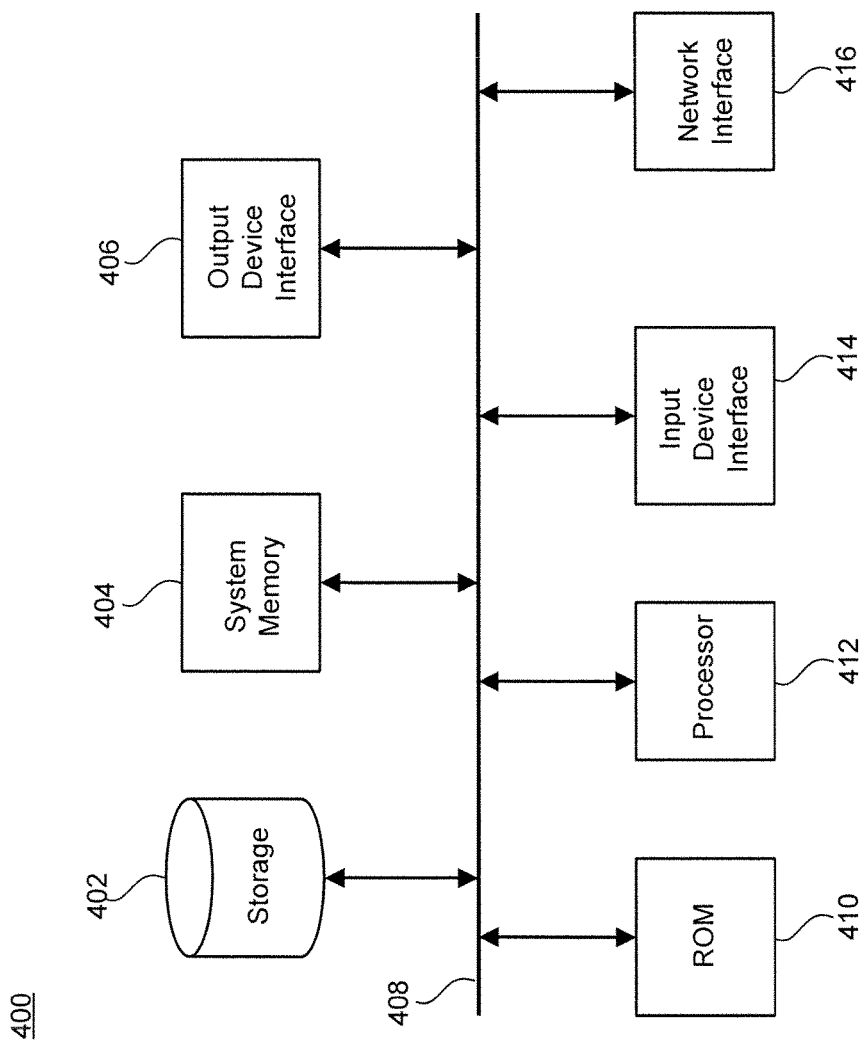
FIG. 4 conceptually illustrates an example electronic system with which some implementations of the subject technology can be implemented.

FIG. 4 conceptually illustrates an example electronic system with which some implementations of the subject technology can be implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (for example, a magnetic or optical disk and its corresponding disk drive) as permanent storage device 402.

Other implementations use a removable storage device (for example, a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, or ROM 410. For example, the various memory units include instructions for providing wireless network access. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, for example, cathode ray tubes (CRT) or liquid crystal displays (LCD). Some implementations include devices, for example, a touchscreen that functions as both input and output devices.

Finally, as shown in FIG. 4, bus 408 also couples electronic system 400 to a network (not shown) through a network interface 416. In this manner, the computer can be a part of a network of computers (for example, a local area network ("LAN"), a wide area network ("WAN"), or an Intranet, or a network of networks, for example, the Internet. Any or all components of electronic system 400 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. An access system for a wireless network, the access system comprising:
   one or more processors; and
   a machine-readable medium comprising instructions stored therein, which when executed by the one or more processors, cause the one or more processors to perform operations comprising:
      broadcasting a message, the message indicating an availability for authentication with a cloud-based service over a public network;
      receiving, from a wireless client device and responsive to the broadcasting, an authentication request comprising credentials for a user account of the cloud-based service, the authentication request being received prior to the wireless client device being associated with the wireless network;
      forwarding, over the public network, the authentication request including the credentials for the user account to a server associated with the cloud-based service for authentication of the credentials for the user account;
      receiving, from the server over the public network, a list of one or more network identifiers that identify one or more networks for which access by the user account of the cloud-based service is authorized; and
      sending the received list of one or more network identifiers to the wireless client device,
      wherein the received list of one or more network identifiers that identify the one or more networks for which access by the user account of the cloud-based service is authorized is sent to the wireless client device prior to the wireless client device being associated with the wireless network.

2. The access system of claim 1, wherein the operations further comprise:
   receiving an association request from the wireless client device in response to sending the received list of one or more network identifiers; and
   associating the wireless client device with the wireless network in response to the association request when the received list of one or more network identifiers transmitted to the wireless client device comprises a network identifier associated with the wireless network, otherwise not associating the wireless client device with the wireless network.

3. The access system of claim 2, wherein the operations further comprise sending a notification of the association of the wireless client device to the server.

4. The access system of claim 1, wherein the list of one or more network identifiers does not include a network identifier associated with the wireless network.

5. The access system of claim 1, wherein the broadcasted message comprises an advertisement.

6. The access system of claim 5, wherein the advertisement comprises a beacon message sent by the access system, and wherein the beacon message is sent prior to the wireless client device sending the authentication request.

7. The access system of claim 5, wherein the operations further comprise receiving an information request from the wireless client device prior to the wireless client device sending the authentication request, and
   wherein the advertisement is sent in response to receiving the information request from the wireless client device.

8. The access system of claim 1, wherein the user account of the cloud-based service is associated with a user of the wireless client device, and wherein the list of one or more network identifiers is ordered based on social indicators associating the user of the wireless client device with network owners of the one or more networks corresponding to the list of one or more network identifiers.

9. The access system of claim 1, wherein the received list of one or more network identifiers that identify the one or more networks comprise one or more service set identifiers (SSIDs) or basic service set identifiers (BSSIDs).

10. The access system of claim 1, wherein the public network comprises the Internet.

11. A non-transitory computer-readable medium storing instructions therein that, when executed by one or more processors, cause the one or more processors to perform operations comprising:
   sending an advertisement by an access system, the advertisement indicating an availability for authentication over a wide area network with a cloud-based service and the access system for accessing a wireless network;
   receiving, from a wireless client device and responsive to the advertisement, an authentication request comprising credentials for a user account of the cloud-based service, the authentication request being received prior to the wireless client device being associated with the wireless network;
   forwarding, over the wide area network, the authentication request to a server associated with the cloud-based service for authentication of the credentials for the user account;
   receiving, from the server over the wide area network, a list of one or more network identifiers that identify one or more networks for which access by the user account of the cloud-based service is authorized; and
   sending, to the wireless client device, the received list of one or more network identifiers that identify the one or more networks for which access by the user account of the cloud-based service is authorized,
   wherein the received list of one or more network identifiers is sent to the wireless client device prior to the wireless client device being associated with the wireless network.

12. The non-transitory computer-readable medium of claim 11, wherein the operations further comprise:
   receiving an association request from the wireless client device in response to sending the received list of one or more network identifiers; and
   associating the wireless client device with the wireless network in response to the association request when the list of one or more network identifiers sent to the wireless client device comprises a network identifier associated with the wireless network.

13. The non-transitory computer-readable medium of claim 11, wherein the advertisement comprises a beacon message, and wherein the beacon message is sent prior to the wireless client device sending the authentication request.

14. The non-transitory computer-readable medium of claim 11, wherein the operations further comprise receiving an information request from the wireless client device prior to the wireless client device sending the authentication request, and
   wherein the advertisement is sent in response to receiving the information request from the wireless client device.

15. The non-transitory computer-readable medium of claim 11, wherein the user account of the cloud-based service is associated with a user of the wireless client device, and
   wherein the list of one or more network identifiers is ordered based on social indicators associating the user of the wireless client device with network owners of the one or more networks corresponding to the list of one or more network identifiers.

16. The non-transitory computer-readable medium of claim 11, wherein the wide area network comprises the Internet.

17. A computer-implemented method comprising:
   broadcasting a message by an access system, the message indicating an availability for authentication with a cloud-based service and the access system for accessing a wireless network;
   receiving, from a wireless client device and responsive to broadcasting the message, an authentication request comprising credentials for a user account of a cloud-based service prior to the wireless client device being associated with the access system;
   forwarding, over a public network the authentication request to a server associated with the cloud-based service for authentication of the credentials for the user account;
   receiving, from the server and over the public network, a data item for identifying one or more network identifiers corresponding to one or more networks for which access by the user account of the cloud-based service is authorized; and
   sending, to the wireless client device, the received data item that identifies the one or more network identifiers corresponding to the one or more networks for which access by the user account of the cloud-based service is authorized,
   wherein the received data item is sent to the wireless client device prior to the wireless client device being associated with the wireless network.

18. The method of claim 17, further comprising:
   receiving an association request from the wireless client device in response to sending the data item; and
   associating the wireless client device with the wireless network in response to the association request when the data item sent to the wireless client device includes a network identifier associated with the wireless network.

19. The method of claim 17, further comprising sending an advertisement indicating availability of authentication with the cloud-based service.

20. The method of claim 19, wherein the advertisement comprises a beacon message, and wherein the beacon message is sent prior to the wireless client device sending the authentication request.

21. The method of claim 20, further comprising receiving an information request from the wireless client device prior to the wireless client device sending the authentication request, and
   wherein the advertisement is sent in response to receiving the information request from the wireless client device.

22. The method of claim 17, wherein the data item comprises a bloom filter configured to identify the one or more network identifiers corresponding to the one or more networks for which access by the user account of the cloud-based service is authorized.

23. A non-transitory computer-readable medium storing instructions therein that, when executed by one or more processors of a wireless client device, cause the one or more processors to perform operations comprising:
   receiving a broadcast message from a first access device, the broadcast message indicating availability of authentication over a public network with a cloud-based service for access to a first wireless network and the broadcast message being received prior to the wireless client device determining whether to associate with the first wireless network;

sending an authentication request to the first access device, the authentication request comprising credentials for a user account of the cloud-based service; and receiving a data item for identifying one or more network identifiers corresponding to one or more networks for which access by the user account of the cloud-based service is authorized, wherein the one or more network identifiers comprises a first network identifier, and wherein the data item is received prior to the wireless client device determining whether to associate with the first wireless network; and associating the wireless client device with the first wireless network without providing the credentials when the first network identifier corresponds to the first wireless network.

24. The non-transitory computer-readable medium of claim 23, wherein associating with the first wireless network comprises:

checking the received data item for the first network identifier corresponding to the first wireless network of the first access device;

sending an association request to the first access device when the data item includes the first network identifier corresponding to the first wireless network of the first access device; and receiving an association confirmation from the first access device confirming association with the first wireless network of the first access device, wherein the association confirmation is distinct from the data item.

25. The non-transitory computer-readable medium of claim 24, wherein the operations further comprise:

sending an authentication request to a second access device for a second wireless network corresponding to a second network identifier included in the data item if the first network identifier corresponding to the first wireless network of the first access device is not included in the data item.

26. The non-transitory computer-readable medium of claim 25, wherein the operations further comprise selecting the second network identifier in the data item based on social indicators associating the user account with a network owner of the second wireless network.

27. The non-transitory computer-readable medium of claim 26, wherein the social indicators comprise frequency of electronic messaging between the user account and the network owner and/or a shared social network group.

28. The non-transitory computer-readable medium of claim 23, wherein the operations further comprise sending an information request message to the first access device, and wherein the broadcast message from the first access device is received in response to the information request message.

29. The non-transitory computer-readable medium of claim 23, wherein the data item comprises a bloom filter configured to identify the one or more network identifiers corresponding to the one or more networks for which access by the user account of the cloud-based service is authorized.

30. A wireless client system comprising:
one or more hardware processors; and
a machine-readable medium comprising instructions stored therein, which when executed by the one or more hardware processors, cause the one or more hardware processors to perform operations comprising:

receiving a broadcast message from a first access device, the broadcast message indicating availability of authentication over a public network with a cloud-based service for access to a first wireless network and the broadcast message being received without the wireless client system being associated with the first wireless network;

sending an authentication request to the first access device, the authentication request comprising credentials for a user account of the cloud-based service;

receiving a list of one or more network identifiers prior to association with the first access device for the first wireless network, wherein the received list of one or more network identifiers identifies one or more networks for which access by the user account of the cloud-based service is authorized;

determining whether the received list of one or more network identifiers includes a first network identifier corresponding to the first wireless network of the first access device;

sending, responsive to the determining, an association request to the first access device when the received list is determined to include the first network identifier corresponding to the first wireless network of the first access device; and receiving an association confirmation from the first access device confirming association with the first wireless network.

31. The wireless client system of claim 30, further comprising:

sending an authentication request to a second access device for a second wireless network corresponding to a second network identifier included in the received list if the first network identifier corresponding to the first wireless network of the first access device is not included in the received list.

32. The wireless client system of claim 31, further comprising selecting the second network identifier in the received list based on social indicators associating the user account with a network owner of the second wireless network.

33. The wireless client system of claim 32, wherein the social indicators comprise frequency of electronic messaging between the user account and the network owner and/or a shared social network group.

* * * * *